(12) United States Patent
Angerer et al.

(10) Patent No.: US 9,779,061 B2
(45) Date of Patent: Oct. 3, 2017

(54) ITERATIVE REFINEMENT APPARATUS

(71) Applicant: INTERNATIONAL BUSINESS MACHINES CORPORATION, Armonk, NY (US)

(72) Inventors: Christoph M. Angerer, Zurich (CH); Konstantinos Bekas, Horgen (CH); Alessandro Curioni, Gattikon (CH); Silvio Dragone, Olten (CH); Heiner Giefers, Langnau am Albis (CH); Christoph Hagleitner, Wallisellen (CH); Raphael C. Polig, Dietkon (CH)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/623,310

(22) Filed: Feb. 16, 2015

(65) Prior Publication Data
US 2015/0234783 A1    Aug. 20, 2015

(30) Foreign Application Priority Data
Feb. 20, 2014    (GB) .................................. 1403018.3

(51) Int. Cl.
*G06F 17/10*    (2006.01)
*G06F 17/16*    (2006.01)
*G06F 17/12*    (2006.01)

(52) U.S. Cl.
CPC .............. *G06F 17/16* (2013.01); *G06F 17/12* (2013.01)

(58) Field of Classification Search
None
See application file for complete search history.

(56) References Cited

U.S. PATENT DOCUMENTS 6,064,808 A * 5/2000 Kapur ................. G06F 17/5036
703/1
8,577,949 B2   11/2013 DeLaquil et al.
(Continued)

OTHER PUBLICATIONS

Buttari, A., et al. "Exploiting Mixed Precision Floating Point Hardware in Scientific Computations," High Performance Computing and Grids in Action, Mar. 2008. vol. 16. (18 Pages).
(Continued)

*Primary Examiner* — Michael D Yaary
(74) *Attorney, Agent, or Firm* — Tutunjian & Bitetto, P.C.; Keivan Razavi

(57) ABSTRACT

An iterative refinement apparatus configured to generate data defining a solution vector x for a linear system represented by $Ax=b$, where A is a predetermined matrix and b is a predetermined vector. An outer solver processes input data, defining the matrix A and vector b, in accordance with an outer loop of an iterative refinement method to generate said data defining the solution vector x. An inner solver processes data items in accordance with an inner loop of the iterative refinement method. The inner solver is configured to process said data items having variable bit-width and data format. A precision controller determines the bit-widths and data formats of the data items adaptively in dependence on the results of the processing steps of the iterative refinement method; the precision controller configured to control operation of the inner solver for processing said data items with the bit-widths and data formats.

17 Claims, 4 Drawing Sheets

(56) References Cited

U.S. PATENT DOCUMENTS

| | | | |
|---|---|---|---|
| 2006/0009956 A1* | 1/2006 | Winckel | G06F 17/13 703/2 |
| 2009/0326880 A1* | 12/2009 | Rodyushkin | G06F 17/5009 703/2 |
| 2011/0010409 A1 | 1/2011 | DeLaquil et al. | |
| 2011/0010410 A1 | 1/2011 | DeLaquil et al. | |
| 2011/0320768 A1 | 12/2011 | Pell et al. | |
| 2012/0005247 A1 | 1/2012 | Bekas et al. | |
| 2013/0144922 A1* | 6/2013 | Par | G06F 17/10 708/400 |
| 2014/0025720 A1 | 1/2014 | Strzodka | |

OTHER PUBLICATIONS

Lee, J., "Iterative Refinement on FPGAS," Tennessee Advanced Computing Laboratory University of Tennessee, Jul. 2011, <http://saahpc.ncsa.illinois.edu/11/presentations/lee.pdf>. (16 Pages).

Liang, G., et al. "ALU Architecture With Dynamic Precision Support," 2012 Symposium on Application Accelerators in High Performance Computing, Jul. 2012. (pp. 26-33).

Strzodka, R., et al. "Pipelined Mixed Precision Algorithms on FPGAS for Fast and Accurate PDE Solvers From Low Precision Components," 14th Annual IEEE Symposium on Field-Programmable Custom Computing Machines, Apr. 2006. (pp. 259-270).

* cited by examiner

ITERATIVE REFINEMENT APPARATUS

BACKGROUND

Technical Field

This invention generally relates to an iterative refinement apparatus for solving linear systems of equations and, more particularly, provides an iterative refinement apparatus for generating data defining a solution vector for such a linear system.

Description of the Related Art

The solution of linear systems of equations is fundamental to numerous scientific and engineering applications. Efficient solutions of large scale linear systems is critical for achieving high energy efficiency and fast turn-around times, as well as permitting handling of increasingly-complex problems in the real-world application in question.

Linear systems can be generally represented by $Ax=b$, where A is a (typically symmetric, positive-definite) matrix of dimensions n×n (i.e., n rows and n columns), and b is a vector of dimensions n×1 (n rows and 1 column). Linear system solvers provide a processing apparatus for processing input data, defining the elements of matrix A and vector b to generate data defining the solution vector x for the system. The processing operation can be performed in accordance with various known techniques for solving linear systems. These techniques can generally be divided into direct methods, which aim to provide a solution in a fixed number of steps, and iterative methods. Iterative methods aim to improve on a current solution in each successive iteration until a desired precision is achieved.

The acceleration of linear system solvers is of high interest for many applications, particularly those involving large-scale linear systems. A standard way to accelerate the solving process is through use of a mixed-precision iterative refinement. A mixed-precision iterative refinement solver performs part of the solving process with high precision, and another part with lower precision to speed up the overall solution process while still providing the final result in high precision. Precision is determined by the accuracy to which values, computed during the processing operation, can be expressed in the corresponding data items. This in turn depends on the data representation, or data type, and in particular the bit-width and data format, used for data items.

The basic iterative refinement method can be expressed by the following algorithm:

$Ax=b$
1. $x_0 \leftarrow A^{-1}b$
2. $k=1$
3. repeat
4. $r_k \leftarrow b - Ax_{k-1}$
5. $z_k \leftarrow A^{-1}r_k$
6. $x_k \leftarrow x_{k-1} + z_k$
7. $k \leftarrow k+1$
8. until convergence Steps 3 to 8 represent an outer loop of the iterative process which is repeated until a convergence criterion is met. Step 5 represents an inner loop of the process. This involves solving the linear system $Az_k=r_k$ in each iteration of the outer loop. A mixed-precision iterative refinement solver uses a high working precision for the outer loop and a low precision for the computationally-intensive inner loop (where the terms "high" and "low" are used here simply to distinguish different levels of precision, one being higher than the other, and do not imply any particular constraints on individual precision levels). The final result (solution vector x) is, thus, provided in high working precision. Common mixed-precision solver implementations use double-precision (64-bit) floating-point as the outer, working precision and single-precision (32-bit) floating-point as the low inner precision.

The choice of inner and outer data representations affects the performance as well as power efficiency of mixed-precision solvers in complex ways. For example, using more bits than strictly necessary per data item in the inner solver increases memory requirements and negatively affects performance of this bandwidth-bound problem. On the other hand, use of too few bits may prevent the system from converging to a final solution. The choice of data format, e.g., format type such as fixed-point or floating-point, location of the point-position, ratio of mantissa/exponent bits etc., is also important. Sub-optimal choice of data representations can thus result in poor performance in terms of power efficiency, accuracy and convergence rates, and can even cause divergence. Conventional mixed-precision iterative refinement systems use a fixed data representation that "works for most cases" for the inner solver. A typical example is single-precision float which has a high dynamic range and a reasonably good resolution for small numbers.

"AIR: Adaptive Dynamic Precision Iterative Refinement", by J. K. Lee, http://trace.tennessee.edu/utk_graddiss/1446/, discusses a direct method for solving linear systems using a floating-point data representation. As explained on page 81 of that document, the system cancels a fixed number of most-significant mantissa bits for a residual quantity in successive iterations of the solution process, according to the predictable convergence rate of the direct solution method. This allows addition of a corresponding fixed number of least-significant mantissa bits to the residual quantity in each iteration, whereby precision steadily increases in fixed increments in successive iterations.

SUMMARY

One embodiment of an aspect of the present invention provides an iterative refinement apparatus for generating data defining a solution vector x for a linear system represented by $Ax=b$, where A is a predetermined matrix and b is a predetermined vector. The apparatus comprises:

an outer solver for processing input data, defining said matrix A and vector b, in accordance with an outer loop of an iterative refinement method to generate said data defining the solution vector x;

an inner solver for processing data items in accordance with an inner loop of said iterative refinement method, the inner solver being operable for processing said data items having variable bit-width and data format; and a precision controller for determining the bit-widths and data formats of said data items adaptively in dependence on results of processing steps during progress of the iterative refinement method, the precision controller being adapted to control operation of the inner solver for processing said data items with the bit-widths and data formats so determined.

In operation of solver apparatus embodying this invention, therefore, the bit-widths and data formats of data items, processed by the inner solver, are adaptively determined by the precision controller in dependence on results during progress of the iterative refinement process, and the inner solver can adapt to the bit-widths and data formats so determined. The data type (where this term is used hereinafter to mean both bit-width and data format) of a data item can thus be dynamically varied in a manner appropriate to a given solution operation, actively adapting to results at different stages of the iterative process. This technique makes an allowance for the fact that optimal data types vary for different solution operations and can change in various ways according to the particular progress of any given solution. By actively adapting data types in the inner solver based on results during progress of a solution process, embodiments of the invention may offer significant improvements in performance and power efficiency of mixed-precision iterative refinement solvers.

The outer solver is typically adapted to perform the outer loop processing with a predetermined working precision, where in general this working precision could be fixed or selectable for different linear systems. As explained earlier, the outer working precision is generally a higher precision than that used for the inner loop processing. Hence, the inner solver is preferably operable to perform the inner loop processing with precision (dependent on the variable data type) which is variable below the working precision of the outer loop. Inner solver precision may, for instance, be variable up to a maximum precision equal to the working precision.

In preferred embodiments, the inner solver comprises solver circuitry which is configurable for processing the data items with variable data types, and the precision controller is adapted to control configuration of the inner solver in dependence on the data types selected. Alternatively, or in addition, the inner solver may comprise a plurality of inner solver modules, each adapted for processing data items in accordance with the inner loop, different solver modules being adapted for processing data items with different bit-widths and/or data formats. The precision controller may then select an appropriate solver module for use in the inner loop in each iteration of the outer loop.

The precision controller is preferably adapted to determine the data types of data items adaptively for commencement of operation of the inner solver in each iteration of the outer loop. The precision controller may then select an appropriate inner solver module and/or configure the inner solver as appropriate for the selected data types in every iteration of the outer loop. The data types selected for commencement of an inner loop could then remain fixed during that inner loop processing (i.e., in that particular iteration of the outer loop). Preferred embodiments, however, can also adaptively vary data types during inner solver operation. In particular, in addition to data type selection on commencement of an inner loop, the precision controller may be adapted to determine at least one of the bit-width and data format for a data item adaptively during operation of the inner solver in each iteration of the outer loop. Also, the precision controller could adaptively vary both bit-width and format during operation of each inner loop as an alternative, or in addition, to data type selection on commencement of an inner loop. Thus, data types can be varied in dependence on results of processing steps during progress of the inner and/or outer loops of the iterative refinement method in different embodiments of the invention.

The precision controller is preferably adapted to determine the data type for a data item so as to inhibit dynamic range (as provided by the data type so determined) being exceeded by the data item value during progress of the iterative refinement method.

That is, data types are preferably selected with a view to avoiding overflow errors in operation. In addition, the precision controller is preferably adapted to determine data types, such that progress of the iterative refinement method tends towards a desired convergence rate. In preferred embodiments, the precision controller is further adapted to determine the data type for a data item such that use of excessive bit-width is inhibited. That is, data type selection can be performed with a view to avoiding bit-widths which are unduly larger than is strictly necessary to ensure that overflow errors are avoided and any convergence constraints are met. For example, precision controller operation may aim to select, as far as possible, the smallest data type that provides sufficient dynamic range and promotes a desired convergence rate. Reducing bit-widths in this way increases the number of operations that can be performed in parallel in the inner solver, enhancing operational efficiency.

In general, the data format for a data item may be varied by varying the data representation in a given format-type, e.g., varying the point location in a fixed-point format, and/or by changing the format-type, e.g., changing between fixed-point, floating-point, logarithmic or other format-types. Hence, in some embodiments at least, the inner solver may be operable for processing data items having different format-types.

The inner solver in preferred embodiments conveniently comprises an integrated circuit and may include more than one such circuit. While some implementations may utilize ASICs (application-specific integrated circuits), the solver circuitry preferably comprises reconfigurable computing circuitry, in particular a reconfigurable integrated circuit such as a FPGA (field-programmable gate array). Such circuits can be readily configured by appropriate software, such as HDL (hardware description language) program code for FPGAs, to implement the solver circuitry by configuration and control of basic computational and memory components. The outer solver in preferred embodiments is conveniently implemented by a host computer running software which programs the computer to implement the outer solver functionality. The precision controller may be implemented, in general, in hardware or software or a combination thereof, and could be implemented wholly or partially in the same device as the outer solver and/or inner solver.

An embodiment of another aspect of the invention provides computer software comprising program code means for causing a computer having reconfigurable computing circuitry to:

process input data, defining a matrix A and a vector b, in accordance with an outer loop of an iterative refinement method to generate data defining a solution vector x for a linear system represented by Ax=b;

configure the reconfigurable computing circuitry to implement an inner solver for processing data items in accordance with an inner loop of said iterative refinement method, the inner solver being configurable for processing said data items having variable bit-width and data format; and determine the bit-widths and data formats of said data items adaptively in dependence on results of processing steps during progress of the iterative refinement method, and control operation of the inner solver for processing said data items with the bit-widths and data formats so determined.

It will be understood that the term "computer" is used in the most general sense and includes any device, component or system having a data processing capability for implementing a computer program. Computer software embodying the invention may, in general, comprise one or more computer programs comprising one or more types of program code means. Moreover, a computer program embodying the invention may constitute an independent program or program set or may be an element of a larger program or program set, and may be supplied, for example, embodied in a computer-readable medium such as a disk or an electronic transmission for loading in a computer. The program code means may comprise any expression, in any language, code or notation, of a set of instructions intended to cause a computer to perform the task in question, either directly or after either or both of (a) conversion to another language, code or notation, and (b) reproduction in a different material form.

An embodiment of another aspect relates to a computer program product, the computer program product comprising a computer readable storage medium having program instructions embodied therewith, the program instructions readable by a computer having reconfigurable computing circuitry to cause the computer to:

process input data, defining a matrix A and a vector b, in accordance with an outer loop of an iterative refinement method to generate data defining a solution vector x for a linear system represented by Ax=b;

configure the reconfigurable computing circuitry to implement an inner solver for processing data items in accordance with an inner loop of said iterative refinement method, the inner solver being configurable for processing said data items having variable bit-width and data format; and determine the bit-widths and data formats of said data items adaptively in dependence on results of processing steps during progress of the iterative refinement method, and control operation of the inner solver for processing said data items with the bit-widths and data formats so determined.

In general, where features are described herein with reference to an embodiment of one aspect of the invention, corresponding features may be provided in embodiments of the other aspect of the invention.

BRIEF DESCRIPTION OF THE DRAWINGS

Preferred embodiments of the invention will now be described, by way of example, with reference to the accompanying drawings in which.

DETAILED DESCRIPTION OF THE EMBODIMENTS

Figure 1:
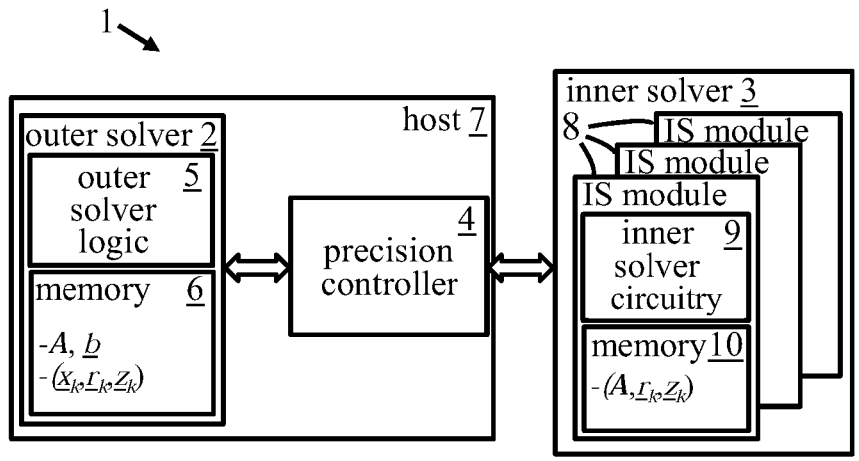
FIG. 1 is a schematic representation of an iterative refinement apparatus embodying the invention.

FIG. 1 is a simplified schematic of a computing system 1, including an iterative refinement apparatus embodying the invention. The iterative refinement apparatus comprises an outer solver 2, an inner solver 3 and a precision controller 4. Outer solver 2 comprises outer solver logic 5, which is adapted to implement processing steps in accordance with an outer loop of an iterative refinement method to generate data defining a solution vector x for a linear system represented by Ax=b. Outer solver 2 includes memory 6 for storing various data used in the solution process, including data defining the matrix A and vector b, and data items corresponding to elements of various vectors $x_k$, $r_k$, and $z_k$ used in the iterative refinement processing. Precision controller 4 comprises control logic for controlling operation of the solver apparatus, including functionality for determining data types and controlling operation of inner solver 3 as described in detail below. The inner solver 3 in this embodiment includes a plurality of inner solver (IS) modules 8, only three such modules being shown for simplicity in the figure. Each IS module 8 includes inner solver circuitry 9 for processing data items in accordance with an inner loop of the iterative refinement method, and memory 10 for storing data used by the inner solver circuitry 9. This includes data defining the matrix A and data items corresponding to elements of vectors $r_k$, and $z_k$ used in the inner loop processing.

The control logic of precision controller 4 and the outer solver logic 5 may be implemented, in general, in hardware or software or a combination thereof. In this embodiment, the functionality of precision controller 4 and outer solver logic 5 are implemented by software running on a host computer 7 so as to program the computer to implement the functionality described. Memory 6 of outer solver 2 is provided by the memory system of host 7. In this embodiment, the IS modules 8 of inner solver 3 are implemented by reconfigurable computing circuitry associated with host 7. This reconfigurable circuitry is ideally implemented as an integrated circuit (or circuits) which can be connected to host computer 7 in any convenient manner, e.g., on a card which connects to the motherboard of the host. In this preferred embodiment, the IS modules 8 are implemented by a field-programmable gate array (FPGA). These well-known circuits include multiple programmable logic components, together with memory elements and a reconfigurable interconnect structure, allowing configuration of the circuitry to implement desired functionality. Programming of an FPGA chip to a desired configuration can be achieved in known manner via associated computing equipment, such as host computer 7 in the system represented in FIG. 1, using HDL (hardware description language) code. The FPGA chip can thus be configured by programming to provide the computer hardware and control logic for implementing the functionality of inner solver circuitry 9. Memory 10 of the IS module 8 is collectively implemented by multiple FPGA memory elements in the resulting circuit configuration. In this embodiment, configuration of the IS modules 8 is controlled by precision controller 4, as discussed in more detail below.

Application software running on host 7 can initiate operation of the iterative refinement apparatus for solving the linear system Ax=b. Data defining elements of the nxn matrix A and n−1 vector b are stored in memory 6 and supplied as input to the outer solver 5. While the following description will focus on the solution of a single linear system Ax=b, in practice, linear system applications typically require solution of multiple such systems for a given matrix A and respective vectors $b_1$, $b_2$, $b_3$, . . . , etc. In the present embodiment, therefore, outer solver logic 5 supports multiple instances of the outer solver processing loop which can proceed in parallel for respective linear systems. The multiple inner solver (IS) modules 8 of inner solver 3 can similarly operate in parallel to perform inner loop processing for the different linear systems.

For a given linear system Ax=b, outer solver logic 5 processes the input data A, b in accordance with an outer loop of the iterative refinement method to generate data defining the solution vector x. Hence, referring to the iterative refinement algorithm given above, outer solver logic 5 performs steps 1 to 4 to generate data items defining elements of the residual vector $r_k$ in each iteration k of the outer loop, updates the current solution vector $x_k$ in step 6, and repeats this process until convergence. The outer solver logic 5 is adapted to perform these processing steps using a fixed data type for data items, such as double-precision floating-point, providing high-precision processing according to the working precision of the application in question.

For the inner loop processing of step 5 of the iterative refinement algorithm, data items corresponding to elements of residual vector $r_k$ are supplied to an inner solver module 8 and stored in memory 10, along with data defining the matrix A. The inner solver circuitry 9 processes the data items in accordance with step 5 of the algorithm to generate data items corresponding to an error vector $z_k$. The inner loop processing may be performed, for example, in accordance with a known linear system solution technique such as a conjugate gradient technique. In general, however, any desired solution method can be used in the inner solver, and operation of the overall iterative refinement apparatus is independent of the particular inner solution method employed. In this preferred embodiment, however, the inner solver circuitry 9 is configurable for processing data items with variable bit-widths and data formats. The data types used in the inner solver are determined adaptively in operation in dependence on results of processing steps during progress of the iterative refinement method for the linear system. Data type determination is performed by precision controller 4, which then controls configuration of the inner solver circuitry 9 for processing data items with the required data types. This process will be described in more detail below. The operating precision of the inner solver thus varies in dependence on the variable data types selected in operation. In this embodiment, data types can be varied to provide a variable "low" operating precision (i.e., below the high working precision of the outer solver) in inner solver 3. The iterative refinement apparatus thus operates as a mixed-precision linear system solver, the inner solver serving as an accelerator with a variable operating precision.

In operation of system 1, precision controller 4 controls scheduling of work items corresponding to the various linear systems $Ax = b_1, b_2, b_3 \ldots$ etc., to the inner solver modules 8. In each case, after data type determination and configuration of the inner solver circuitry 9, precision controller 4 loads the necessary data to the solver module 8 and initiates the inner loop processing. The error vectors $z_k$ from the inner loop processing are returned by precision controller 4 to the appropriate outer loop instance in outer solver logic 5. The work items for the multiple linear systems can be managed in a streaming pipeline in host computer 7 under control of precision controller 4. Hence, work items can be queued for processing by precision controller 4, both for allocation to IS modules 8 and return of the inner loop result data to outer solver 2, in successive iterations of the parallel solution processes. For simplicity in the following, however, operation of the mixed-precision solver apparatus will be described for a single linear system $Ax = b$.

Figure 2:
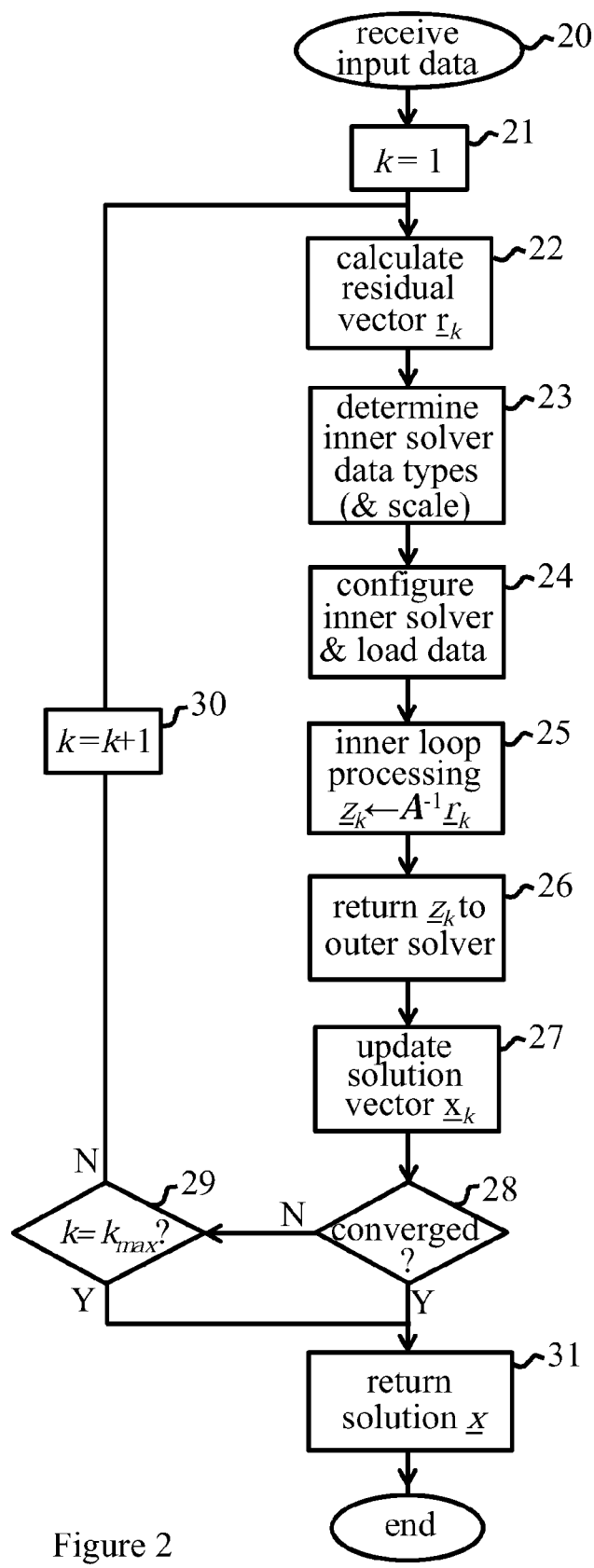
FIG. 2 is a flow chart indicating steps performed in operation of the iterative refinement apparatus.

FIG. 2 indicates key steps in operation of a first embodiment of the solver apparatus 1. In this embodiment, the precision controller 4 adaptively determines data types for commencement of operation of the inner solver in each iteration of the outer loop. Operation begins, as indicated at step 20, on receipt by outer solver 2 of the input data for the linear system to be solved. As well as defining the matrix A and vector b, this input data may include additional set-up data for the solution process, such as a limit $k_{max}$ on the number of iterations to be performed and data defining the convergence criterion for the solution process. In step 21, an iteration counter k is initialized to k=1 by outer solver logic 5. Next, in step 22, solver logic 5 calculates the residual vector $r_k$ for the first iteration of the outer loop. The residual vector $r_k$ is supplied to precision controller 4 which, in step 23, determines the data types to be used for the inner solver processing in the current iteration of the outer loop. This process, which may involve scaling of data item values, is explained in more detail below. In step 24, precision controller 4 configures an inner solver module 8 for performing the inner loop processing with the selected data types. This can be achieved by suitable configuration of the FPGA circuitry as described above to provide registers accommodating the required bit-widths, and compute units adapted to process data items with the selected formats. Appropriate circuit configurations may be achieved in various ways, according to the selected data types, and suitable implementations in any given case will be readily apparent to those skilled in the art. Precision controller 4 then loads the data for the inner loop processing to the solver module 8. This data includes data items corresponding to residual vector $r_k$ and matrix A, plus any set-up data for the solution process, e.g., iteration constraints, convergence criteria or other parameters required for the inner solution method. In step 25, the inner solver circuitry 9 processes the data items in accordance with the inner solution process, and the resulting error vector $z_k$ is returned to the outer solver 2, via precision controller 4, in step 26. Outer solver logic 5 updates the current solution vector $x_k$ in step 27, and then tests for convergence in decision step 28. The convergence criterion specifies when a solution of the desired accuracy has been achieved. This may be defined, for instance, in terms of a specified improvement over the initial solution vector and/or no progress (i.e., improvement less a threshold amount) between successive iterations of the outer loop. If the system has not converged ("N" at step 28), the outer solver logic 5 checks whether a predefined maximum number of iterations $k_{max}$ of the outer loop have been performed in step 29. If not ("N" at step 29), the iteration count k is incremented in step 30, and operation reverts to step 22 for a further pass of the outer loop processing. Steps 22 to 27 thus iterate until either convergence is detected ("Y" at step 28), or $k_{max}$ iterations have been completed ("Y" at step 29). Operation then proceeds to step 31 wherein the outer solver 2 returns the final solution vector x to the linear system application. The process is then complete.

Figure 3:
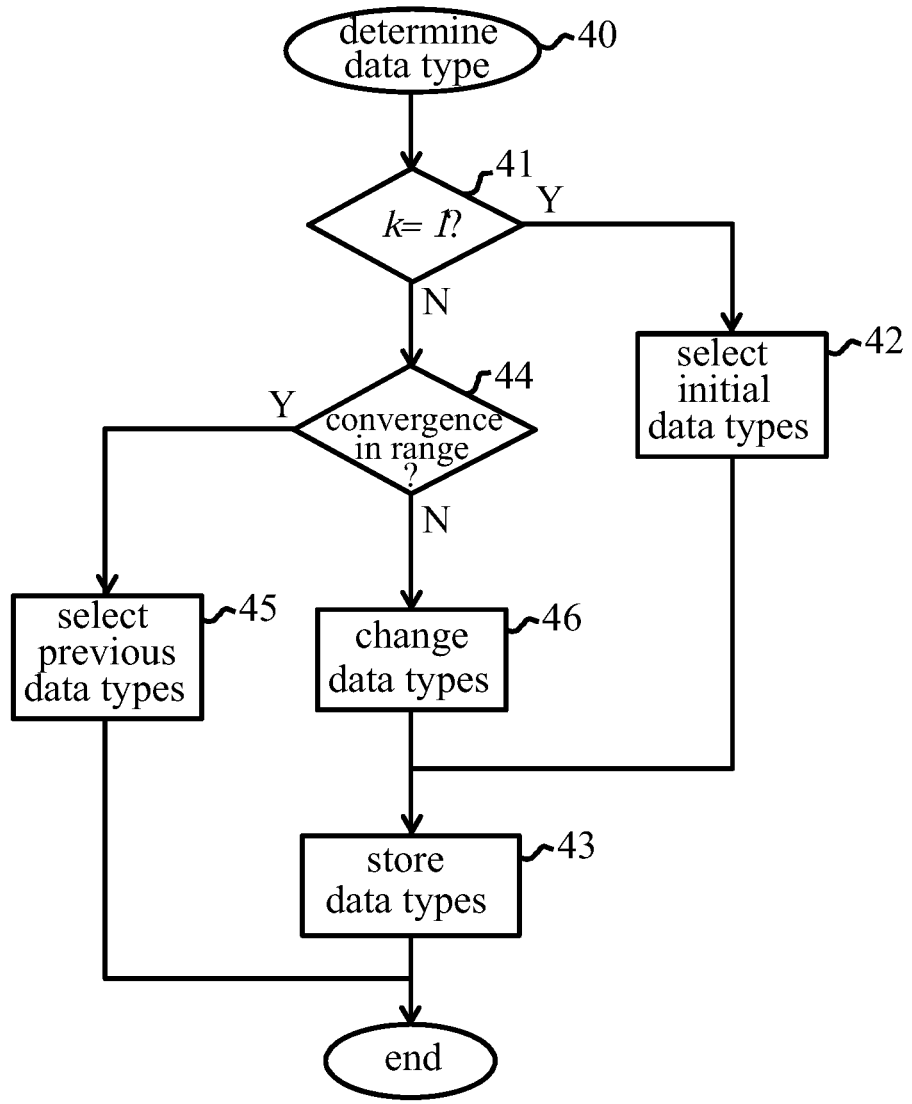
FIG. 3 is a more detailed breakdown of a data type determination step in FIG. 2.

Referring to FIG. 3, the process for determining data types in step 23 of FIG. 2 is illustrated in more detail. After operation begins in step 40, the precision controller 4 decides, in step 41, whether the current processing stage is the first iteration of the outer loop for the linear system. If so, the precision controller 4 selects initial data types to be used for the inner solver operation in step 42. In particular, the bit-widths and data formats to be used for data items corresponding to the input vector $r_k$, result vector $z_k$, and each temporary vector $s_k$ used during iteration of the inner solution process, are determined here by precision controller 4. The particular number and form of temporary vectors here may vary according to the inner solution process used. Such temporary vectors are represented for simplicity here by single vector $s_k$. These initial data types may be determined in any appropriate manner. For example, initial data types may be selected, according to the data values corresponding to matrix A and vector $r_k$ supplied by outer solver 2, in a predefined manner based on specified requirements (e.g., desired precision and convergence rate) and heuristic data for the linear system application in question. For instance, an appropriate format type, e.g., fixed-point, floating-point, logarithmic, etc. may be selected for the data items based on application requirements and heuristics for the system. Data item bit-width, and the particular formatting of the selected format type (e.g., point location in a fixed-point format, ratio of mantissa to exponent bits in a floating-point format, etc.) may be set according to expected variation in item values over the inner solution processing with a view to satisfying dynamic range and precision requirements. In any case, following initial data type selection in step 42, in step 43 the precision controller 4 records the current data types in memory 6 for use later in the solution process. Operation then continues with step 24 of FIG. 2.

Returning to step 41 of FIG. 3, in subsequent iterations of the outer loop for the linear system, i.e., k≠1 in step 41, operation proceeds to decision step 44. In this step, the precision controller 4 decides if the current convergence rate for the system, based on progress of the outer loop, is within a defined range, i.e., that the convergence rate is neither too high nor too low according to the specified criterion. If so, ("Y" at step 44), then operation proceeds to step 45. Here, precision controller 4 selects the same data types as in the previous iteration (k−1) of the outer loop for the next inner solution process. The previous data types are thus retrieved from memory 6 and operation continues to step 24 of FIG. 2 to initiate the inner solution process.

Returning to step 44 of FIG. 3, if the current convergence rate is outside the required range, operation proceeds to step 46 in which the precision controller 4 changes the data types to be used for the next inner solution process. This process is explained in more detail below with reference to FIG. 4. The new data types are then stored in step 43 and operation continues with step 24 of FIG. 2.

Figure 4:
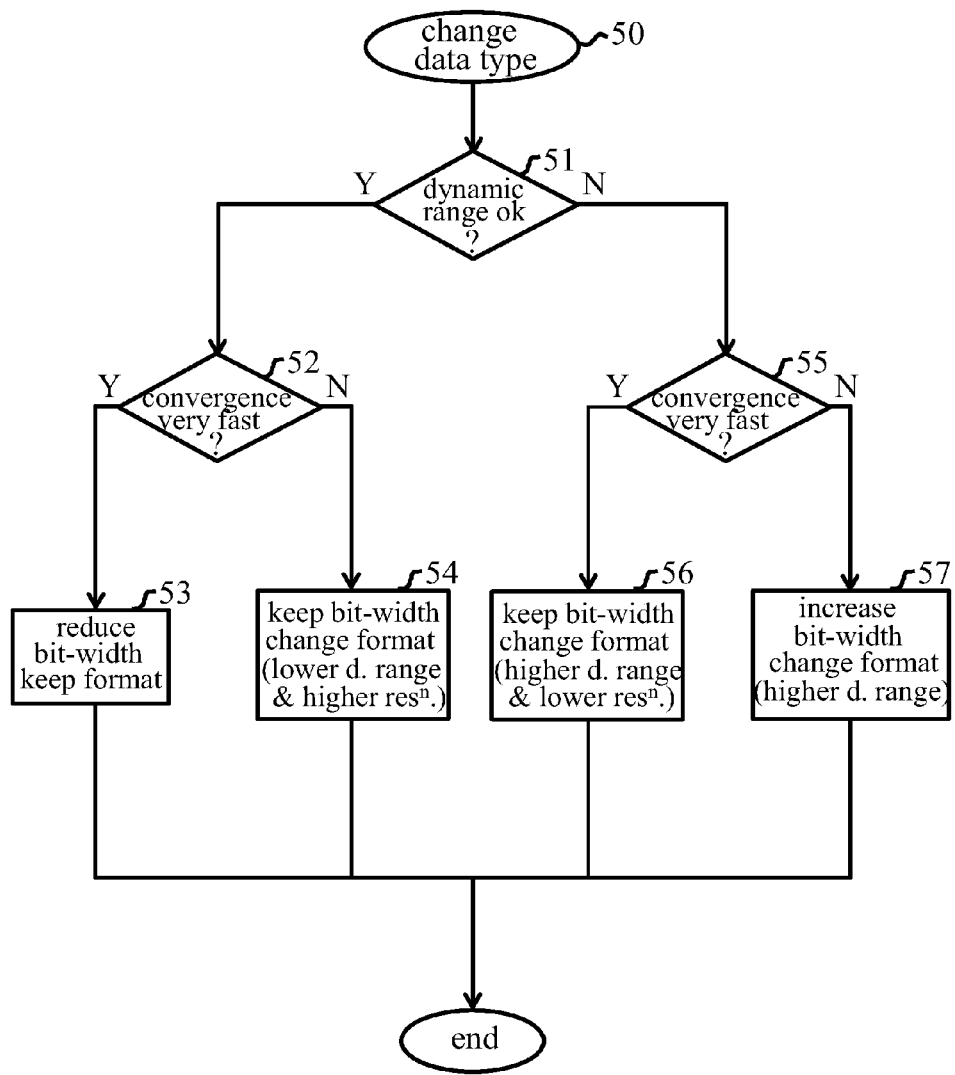
FIG. 4 is a more detailed breakdown of a data type adjustment step in FIG. 3.

Now referring to FIG. 4, a more detailed breakdown of the procedure for changing data types in step 46 of FIG. 3 is shown. After operation begins in step 50, the precision controller 4 first decides in step 51 if the dynamic range provided by the current data type is adequate for a data item. This can be assessed by precision controller 4 based on the (known or expected) data item values for vectors $r_k$, $z_k$, and $s_k$ for the current inner solution process and the dynamic range provided by the previous data type for that item. For example, if a data item value became saturated, or approached saturation, in the previous iteration (k−1), then dynamic range can be deemed inadequate. If the dynamic range is deemed sufficient in step 51, the precision controller 4 then decides in step 52 if the current convergence rate is higher than the desired range used in step 44 of FIG. 3. If so, i.e., if convergence is very fast, then the data type is varied, in step 53, by reducing the bit-width but maintaining the current format. If, however, convergence is too slow ("N" at step 52), then the data type is varied in step 54 by maintaining the current bit-width but changing the data format to reduce dynamic range but increase resolution. The precise change required here will depend on the type of format in use, but may, for instance, involve moving the point position to the left (more significant bit-position) in a fixed-point format.

Returning to step 51 of FIG. 4, if dynamic range is deemed insufficient here, the precision controller 4 then decides in step 55 if the current convergence rate is higher than the desired range. If so, then the data type is varied in step 56 by maintaining the current bit-width but changing the format to increase dynamic range but reduce resolution, e.g., by moving the point position to the right (less significant bit-position) in a fixed-point format. If, however, convergence is too slow ("N" at step 55), then the data type is varied in step 57 by increasing the current bit-width and formatting to increase dynamic range but maintain the same resolution as before (e.g., by maintaining the point position but adding bits on the left in a fixed-point format).

When changing the data format in FIG. 4, the format may be varied by varying the data representation in a given format-type (e.g., varying the point position in a fixed-point format) and/or by changing the format-type, i.e., changing between a fixed-point, floating-point, logarithmic or other format-type. In general, the bit-width and data format can be selected as required and may differ for different data items as appropriate. Hence, the process shown in FIG. 4 can be performed individually for data items, in particular data items corresponding to vectors $r_k$, $z_k$, and $s_k$ in the inner solution process, as required. If performance limits are reached in performing FIG. 4, i.e., if bit-width and/or format cannot be changed further in the required manner due to hardware restrictions in inner solver circuitry 9, then the bit-width/format is maintained at the current limit. However, in general, when selecting data types in FIG. 4 or in step 42 of FIG. 3, the precision controller 4 may scale (e.g., normalize) data item values as appropriate to keep within desired operating ranges.

It will be understood from the above that precision controller 4 serves to adaptively determine data types for the inner solver such that: (1) overflow errors, where dynamic range provided by a selected data type is exceeded by the data item value, are inhibited; (2) progress of the iterative refinement method tends towards the desired convergence rate; and (3) use of excessive bit-width is avoided as far as possible. In particular, the precision controller 4 can be adapted to select, as far as possible, the smallest data type that provides sufficient dynamic range and promotes a desired convergence rate. Reducing bit-widths in this way increases the number of numeric operations that can be performed in parallel and reduces necessary memory bandwidth in the inner solver. Moreover, since data types are determined adaptively in dependence on the results during progress of the solution process, operation of the mixed-precision solver can actively adapt, as appropriate, for a given solution operation and to the particular progress of that solution operation. The apparatus can, therefore, adapt to accommodate variable optimal data types for different linear systems, and can also adapt as the optimal data type changes in various ways during the solution of a given system. This offers significant improvements in performance and power efficiency compared to prior mixed-precision iterative refinement solvers.

In the above system, precision controller 4 determines data types at the start of the inner loop processing in each iteration k of the outer loop. In addition, however, the precision controller 4 could dynamically adapt data types during operation of the inner solver in each iteration of the outer loop. For example, after each iteration of the inner loop in a solver module, the solver circuitry 9 could return the current data item values, corresponding to the current error vector $z_k$ and temporary vector(s) $s_k$, to precision controller 4. The precision controller may then check data types generally in accordance with steps 44 to 46 of FIG. 3, adjusting the data types as necessary. The convergence rate range used in the equivalent of step 44 here may be calculated as appropriate for the inner loop based on the desired outer-loop convergence rate. The precision controller 4 can then control operation of the inner solver module, reconfiguring the inner solver circuitry 9, if necessary, to use the newly-determined data types in the next iteration of the inner loop solution process.

Figure 5:
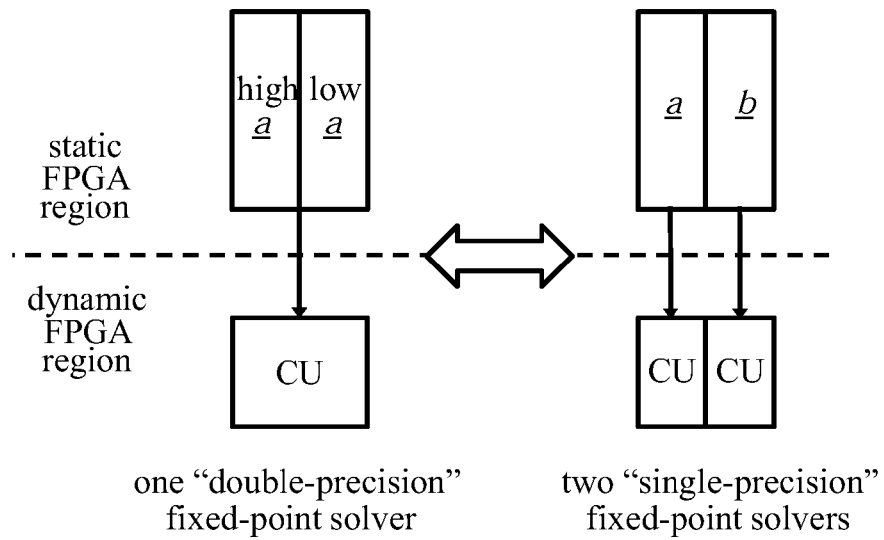
FIG. 5 shows an example of circuit reconfiguration for dynamic bit-width adjustment in inner solver circuitry of the iterative refinement apparatus.

In general, at least one of bit-width and data format may be adaptively varied during operation of the inner solver in a given iteration k of the outer loop. In embodiments where only limited format variation is accommodated, e.g., scaling and point-position adjustment with a fixed-point format, dynamic circuit reconfiguration during operation of the inner solver may not be required. The precision controller 4 may simply adjust scale and point position as required, the inner solver circuitry 9 being adapted to process data items with variable point-position. As a particular example here, a fixed-point conjugate gradient solver which may be used as an inner solver module 8 is described in our co-pending UK patent application, filed concurrently herewith under Applicant's file reference CH9-2013-0088, the content of which is hereby incorporated by reference herein. However, accommodating a variable bit-width in the inner solver circuitry 9 can be readily achieved by appropriate reconfiguration of circuit components. Now referring to FIG. 5, a simple illustration of the basic principle here is illustrated. The diagram on the right of the figure shows a configuration in which two computational units ("CU") use respective p-bit registers storing bit-strings a and b. The diagram on the left shows an alternative configuration in which a single computational unit uses both p-bit registers storing bit-strings "high a" and "low a", corresponding respectively to the p most-significant and p least-significant bits of a single bit-string. The same circuit elements can thus be configured to perform two "single-precision" operations or a single "double-precision" operation. By extending this principle to multiple circuit elements, the overall circuitry could be configured as a single "double-precision" solver or two "single-precision" solvers for different iterations of the inner loop processing. Loss of data from memory elements can be avoided here using FPGAs with both static and dynamic regions providing for dynamic partial reconfiguration. In particular, if memory elements are contained in the static FPGA region and compute units in the dynamic region as indicated in FIG. 5, the circuit can be dynamically reconfigured without loss of data, avoiding the need to transfer and re-store intermediate result data on reconfiguration. Of course, while a simplistic single/double precision reconfigurable system is illustrated for ease of explanation here, in general configurations can be adapted as required to accommodate any desired bit-width variation.

In some implementations of the system shown in FIG. 1, a single inner solver module 8 could be allocated to a given linear system, this module being successively reconfigured as required to perform inner loop processing in successive iterations k of the outer loop for that system. Alternatively, for example, different IS modules 8 could be allocated according to availability to perform the inner loop processing in different iterations k of the outer loop for a given system, reconfiguration being performed as necessary for the selected module.

Various changes can, of course, be envisaged to the exemplary system described above. For example, inner solver 3 may be operable in other ways for processing data items with variable data types. In some embodiments, for instance, the inner solver modules 8 may be adapted for processing data items with different bit-widths and/or data formats. The precision controller 4 may then select an appropriate solver module 8 capable of processing the selected data types for inner loop processing in each iteration of the outer loop. Each IS module 8 could be adapted to cope with a different bit-width or range of bit-widths and/or a different format or set of format options. Individual modules may also be reconfigurable under control of the precision controller 4 in such embodiments.

Precision adjustment may also be performed in some embodiments if the maximum number of iterations $k_{max}$ is reached in step 29 of FIG. 2 without the system achieving convergence. In this event, the solution process could be restarted with a modified data type selection process in precision controller 4. For example, the selection of initial data types in step 42 of FIG. 3 and/or the criterion (such as convergence range used in step 44 and/or incremental changes to data types in steps 53 to 57 above) may be adjusted to promote convergence in a subsequent run.

Inner solver modules 8 may be implemented, in general, on the same or different FPGAs. While FPGAs offer particularly convenient implementations, other reconfigurable circuitry may of course be employed. Some inner solver implementations may use ASICs (application-specific integrated circuits), for instance, though circuit options may then be constrained to a more limited number of configurations built-in specifically to the ASIC circuitry.

Simple embodiments may support solution of only one linear system at a time, whereby multiple inner solver modules may not be required.

While precision controller 4 is implemented by software on host 7 above, other arrangements can be envisaged. In some embodiments, for instance, the precision controller 4 may be implemented, at least in part, by hard-wired logic on the same chip as the inner solver circuitry.

It will be appreciated that many other changes and modifications can be made to the exemplary embodiments described without departing from the scope of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. An iterative refinement apparatus configured to generate data defining a solution vector x for a linear system represented by Ax=b where A is a predetermined matrix and b is a predetermined vector, the apparatus comprising:
   an outer solver configured to process input data, defining said matrix A and vector b, in accordance with an outer loop of an iterative refinement method and generate said data defining the solution vector x;
   an inner solver configured to process data items in accordance with an inner loop of said iterative refinement method, the inner solver configured to process said data items having variable bit-widths and data formats; and
   a precision controller configured to determine the bit-widths and the data formats of said data items adaptively in dependence on results of the processing of input data and data items during the iterative refinement method, the precision controller being further configured to control operation of the inner solver configured to process said data items with the bit-widths and the data formats so determined.

2. The apparatus as recited in claim 1, wherein:
   the inner solver comprises solver circuitry configured to process said data items with variable bit-widths and data formats; and
   the precision controller is configured to control configuration of the inner solver in dependence on said bit-widths and data formats so determined.

3. The apparatus as recited in claim 1, wherein:
   the inner solver comprises a plurality of inner solver modules each configured to process data items in accordance with said inner loop, different solver modules being configured to process data items with different bit-widths and/or data formats; and
   the precision controller is configured to select a solver module for use in said inner loop in each iteration of said outer loop.

4. The apparatus as recited in claim 1, wherein the precision controller is further configured to determine the bit-widths and the data formats of said data items adaptively for commencement of operation of the inner solver in each iteration of said outer loop.

5. The apparatus as recited in claim 4, wherein the precision controller is further configured to determine at least one of the bit-widths and the data formats of a said data items adaptively during operation of the inner solver in each iteration of said outer loop.

6. The apparatus as recited in claim 1, wherein the precision controller is further configured to determine the bit-widths and data formats of said data items adaptively during operation of the inner solver.

7. The apparatus as recited in claim 1, wherein the precision controller is further configured to determine the bit-widths and the data formats of said data items to inhibit dynamic range, provided by the bit-widths and the data formats so determined, being exceeded by a data item value during the iterative refinement method.

8. The apparatus as recited in claim 1, wherein the precision controller is further configured to determine the bit-widths and the data formats of said data items such that the iterative refinement method tends towards a desired convergence rate.

9. The apparatus as recited in claim 1, wherein the precision controller is further configured to determine the bit-widths and the data formats of said data items such that use of excessive bit-width is inhibited.

10. The apparatus as recited in claim 1, wherein the inner solver is further configured to process said data items having data formats of different format-types.

11. The apparatus as recited in claim 1, wherein the precision controller is further configured to scale values of said data items when determining said bit-widths and said data formats.

12. The apparatus as recited in claim 1, wherein said data items correspond to vectors used in the iterative refinement method.

13. The apparatus as recited in claim 1, wherein the outer solver is further configured to process with a predetermined working precision.

14. The apparatus as recited in claim 13, wherein the inner solver is further configured to process with precision, dependent on said variable bit-width and data format, which is variable below said working precision.

15. The apparatus as recited in claim 1, wherein the outer solver is implemented by a host computer.

16. The apparatus as recited in claim 1, wherein the inner solver comprises a reconfigurable integrated circuit.

17. A computer program product, the computer program product comprising a non-transitory computer readable storage medium having program instructions embodied therewith, the program instructions readable by a computer having reconfigurable computing circuitry, the computer configured to:

process, by an outer solver, input data, defining a matrix A and a vector b, in accordance with an outer loop of an iterative refinement method to generate data defining a solution vector x for a linear system represented by Ax=b;

configure the reconfigurable computing circuitry to implement an inner solver for processing data items in accordance with an inner loop of said iterative refinement method, the inner solver being configured to process said data items having variable bit-width and data format; and determine, by a precision controller, the bit-widths and data formats of said data items adaptively in dependence on results of the processing of input data and data items during the iterative refinement method, and control, by the precision controller, operation of the inner solver configured to process said data items with the bit-widths and the data formats so determined.

* * * * *